May 20, 1952  J. J. COLEMAN ET AL  2,597,456
PRIMARY CELL
Original Filed Nov. 20, 1948
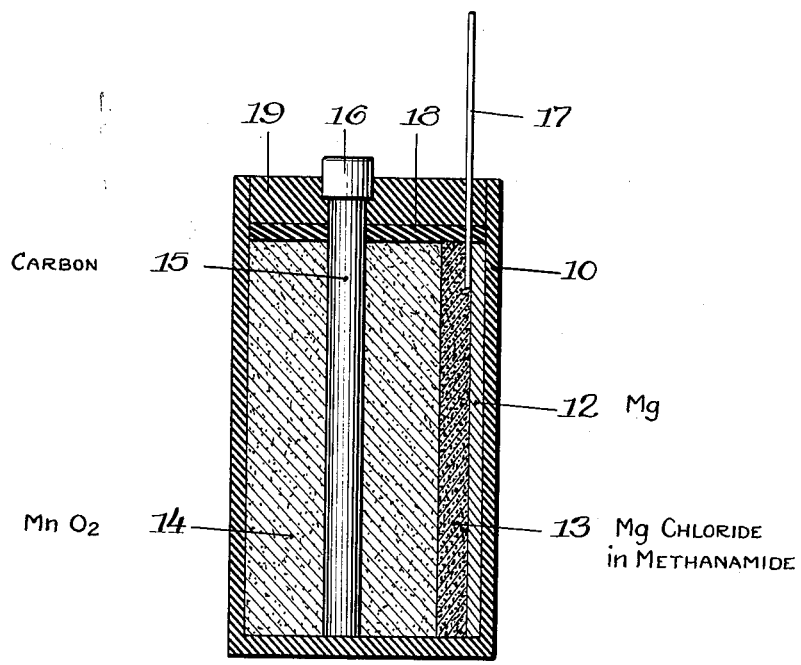
Inventors,
Joseph J. Coleman
and Demetrios V. Louzos,
By: Jones, Tesch & Darbo
Attys.

Patented May 20, 1952

2,597,456

UNITED STATES PATENT OFFICE 2,597,456

PRIMARY CELL

Joseph J. Coleman, Freeport, and Demetrios V. Louzos, Waukegan, Ill., assignors to Burgess Battery Company, Freeport, Ill., a corporation of Delaware Original application November 20, 1948, Serial No. 61,244. Divided and this application October 20, 1951, Serial No. 252,324

4 Claims. (Cl. 136—100)

This invention relates to improvements in primary cells adapted for the delivery of electrical current, and particularly to an improved primary cell having a non-aqueous electrolyte.

Heretofore, current producing primary cells have employed aqueous electrolytes. The principal reason for this is that water readily ionizes the electrolyte compound and such ionization promotes electrolytic action and conductivity. It has been the belief heretofore that an aqueous electrolyte is necessary in order to provide the ionization required for the satisfactory production of current output.

The use of an aqueous electrolyte, however, has the disadvantage that it tends to attack the negative electrode while the cell is not in operation, with the result that the cell undergoes persistent deterioration and exhaustion unless the mentioned tendency is successfully resisted. The avoidance of excessive deterioration and exhaustion from this cause has been one of the chief problems confronting the primary battery industry. The tendency is more pronounced with the more highly electronegative metals, such as magnesium, and the use of such metals has been generally avoided for this reason. The latter are naturally more desirable because they impart to the cell a higher voltage and the ability to deliver a greater amount of electrical energy but, nevertheless, little use has been made of them in the past because they are more susceptible to attack by the aqueous electrolyte.

In accordance with the present invention, it has been found that primary cells having satisfactory current delivering properties can be made with an electrolyte containing a non-aqueous solvent, that is, a substantially water-free organic solvent. It has been found that certain non-aqueous solvents dissolve electrolyte salts and otherwise function in a manner such as to provide suitable electrolytic action and satisfactory energy delivery performance. In addition, electrolytes containing such non-aqueous solvents exhibit markedly less attack upon the negative electrode than do water and the aqueous electrolytes employed heretofore.

It is the object of the invention to provide an improved primary cell employing a non-aqueous solvent in the electrolyte in which cell the negative electrode suffers only slight attack by the electrolyte and does not undergo objectionable deterioration and exhaustion when the cell is not in operation.

It is a further object of the invention to make it possible to use a more highly electronegative metal such as magnesium for the negative electrode, thus providing a cell having a higher voltage and reducing the number of cells required in a battery of predetermined voltage, and, in general, providing a battery capable of delivering a high output of electrical energy for its size. Another advantage flowing from the use of magnesium is that it is one of the more abundant and readily available metals.

A further object of the invention is to provide a primary cell in which oxidizing agents may be used which are soluble in water and, therefore, may not be used in cells having an aqueous electrolyte unless a porous cup or other arrangement is employed to keep the oxidizing agent out of contact with the negative electrode.

Other objects and advantages will become apparent as the following description progresses, which is to be taken in conjunction with the accompanying drawing, in which the single figure is a sectional elevation of a primary cell in accordance with the present invention.

The cell comprises a container 10 which is generally rectangular in shape, but may be of any desired shape, and is open at the top. The container is composed of a non-conductive material which is resistant to moisture and the electrolyte of the cell, such as rubber hydrochloride, phenol formaldehyde resin, or the like.

Adjacent to the interior surface of a wall of container 10 is the metal negative electrode 12 which is in the form of a flat plate having a height somewhat less than that of the container 10. Adjacent to the negative electrode is a layer of bibulous non-conductive material 13, such as blotting paper. The bibulous layer 13 absorbs the liquid electrolyte of the cell. Adjacent to the bibulous layer 13 is a body of oxidizing material 14 which may be a compacted liquid absorbent mass of finely divided particles of a mixture of conductive material, such as graphite, carbon black or other form of carbon, and an oxidizing agent which serves as a depolarizer for the cell. Said oxidizing agent will be described more fully hereinafter. The proportions of oxidizing agent and conductive material are not critical, it being necessary only to provide sufficient of each to afford the desired conductivity and oxidizing activity. The oxidizing body 14 absorbs the electrolyte, whereby the electrolyte is present in both the body 14 and the bibulous layer 13.

Embedded in the oxidizing body 14 and in conductive contact therewith is the positive electrode 15 of the cell, which may be composed of an inert conductive substance and may be in any desired form. In the specific cell shown, it is composed of carbon and is in the form of a cylindrical rod having its upper end portion projecting above the oxidizing body 14. The said projecting end has a metal cap 16 fitting frictionally thereover, said cap serving as one terminal of the cell. The negative electrode 12 has a conductor 17 connected thereto and serving as the second terminal of the cell. Conductor 17 may be a strip of the same metal as that of which electrode 12 is composed, and may be connected to the electrode by welding. A sheet of nonconductive electrolyte-resistant material 18, which may be similar to the material of which container 10 is composed, is fitted into container 10 upon the tops of the cell elements. The electrode 15 and terminal 17 project upwardly through the sheet 18. The top of the cell is sealed by pouring into the upper portion of the container 10 and upon the sheet 18 a molten sealing composition, such as wax or pitch, which solidifies upon cooling to form the seal closure 19. The terminals 16 and 17 project above the sheet 18 and the seal 19 and are adapted for connection to an external circuit.

A liquid electrolyte is introduced into the container 10 and is absorbed and retained by the bibulous layer 13 and the oxidizing body 14 and is in conductive contact with the negative electrode 12 and the oxidizing body 14. The electrolyte of the cell is a solution comprising a solvent component which is a non-aqueous liquid and a solute component which is a compound which renders the solution conductive and when in the solution is electrolytically reactive and spontaneously unreactive toward the negative electrode.

In accordance with the present invention, the solvent which may be employed is methanamide. This compound is liquid at ordinary temperature and by itself is inert toward the electrodes and the oxidizing agent, i. e., it does not appreciably attack or corrode said elements.

For the negative electrode 12, a metal is employed which is highly electronegative with respect to the positive electrode, such as magnesium and calcium. Magnesium is preferred, because it is readily available, stable under most conditions, and produces a relatively high cell voltage.

For the positive electrode 15, a conductive material is chosen which is substantially inert toward the electrolyte, both in the presence and the absence of the electrolytic action of the cell. Carbon is suitable and where silver chloride is used as the oxidizing agent as described hereinafter, silver may be used. In the specific cell illustrated, the electrode 15 is a compressed body of carbon similar to that commonly used in dry cells of the LeClanche type.

For the reactive electrolyte compound, a substance is chosen which is soluble in the organic solvent and forms therewith an electrolytically conductive solution. Also, when in solution in the solvent it is electrolytically reactive toward the material of the negative electrode, but is spontaneously unreactive toward said electrode, i. e., it is reactive toward the negative electrode when the cell electrodes are connected together through an external circuit and the cell is operative, and unreactive when the electrodes are not connected together and the cell is inoperative. Also, it does not cause the plating of metal upon the negative electrode. The amount of reactive compound is not critical, it being only necessary to supply sufficient thereof to provide the desired reactivity and conductivity. During operation of the cell, the electrolyte enters into reaction with the negative electrode. Electrolyte compounds which have been found to be suitable are the chloride, nitrate and perchlorate of magnesium and the chlorides, nitrates and perchlorates of the metals which are electronegative with respect to magnesium. The chloride, nitrate and perchlorate of magnesium are preferred.

At ordinary temperatures, magnesium chloride and magnesium nitrate exist normally in the form of the hexahydrates $MgCl_2.6H_2O$ and $Mg(NO_3)_2.6H_2O$, and magnesium perchlorate exists in the anhydrous form and also in the form of various hydrates. Such hydrates, as well as the anhydrous magnesium perchlorate, are suitable in the non-aqueous system of the present invention. When the solid hydrate goes into solution in the organic solvent, it continues to exhibit hydrating power, that is, the power to bind water, with the result that the water of hydration remains bound thereto and the organic solvent remains free of water. The different hydrates possess hydrating power in varying degrees, and in some instances a small amount of water may become dissociated therefrom and exist in freedom in the solvent. Such water will then react with the negative electrode and cause a slight corrosion of the latter. Such water is quickly consumed, however, and does not do objectionable damage, and the solvent assumes its non-aqueous character. In the same way, the invention contemplates that a small amount of water may be present initially in the electrolyte. This water is quickly consumed in reacting with the negative electrode and the solvent then assumes its non-aqueous character. The solution of the reactive electrolyte compound in the solvent forms the electrolyte of the cell.

For the oxidizing agent which is included in the oxidizing body 14, a substance is preferred which is insoluble in the electrolyte. The oxidizing agent is one of the factors which determines the potential of the positive electrode, and one should be chosen which provides the desired output voltage of the cell. Oxidizing agents which have been found to be suitable for the purpose are manganese dioxide, lead dioxide, the persulfates of sodium and potassium, silver chloride, cupric oxide, or the like.

The solution which has been described heretofore and which is held by the oxidizing body 14 and the absorbent layer 13 forms the electrolyte for the cell, providing electrolytic conductivity between the electrodes 12 and 15 and entering readily into electrolytic reaction with the negative electrode 12 and the oxidizing body 14, whereby the cell has strong current delivering powers.

A specific example of a satisfactory cell in accordance with the invention is one having the mechanical construction described heretofore and composed of elements as follows: the negative electrode is composed of magnesium and the positive electrode is composed of carbon; the solvent is methanamide and the reactive electrolyte compound is magnesium chloride hexahydrate, $MgCl_2.6H_2O$, which is present in the amount of 500 grams per liter of solution, and provides satisfactory reactivity and conductivity; the oxidizing body 14 is a mixture, the solid components of which comprise approximately 90% by weight of finely divided manganese dioxide and approximately 10% of thermal acetylene black; the separating member 13 is composed of blotting paper. Such a cell has an open circuit voltage of 2.30 volts, and is adapted to deliver current of substantial value.

This application is a division of our copending application Serial No. 61,244, filed November 20, 1948. Primary cells of a character generally similar to that described herein and employing different organic solvents in the electrolyte are disclosed in our copending applications Serial Nos. 61,245, 61,246, 61,247 and 61,248, all filed November 20, 1948.

What is claimed is:

1. A primary cell comprising a positive electrode a negative electrode from the group consisting of magnesium and calcium, and an electrolyte in contact with said electrodes comprising a substantially water-free methanamide solvent containing dissolved therein a compound from the group consisting of the chloride, nitrate and perchlorate of magnesium and the chlorides, nitrates and perchlorates of the metals which are electronegative with respect to magnesium.

2. A primary cell comprising a positive electrode and a magnesium negative electrode, and an electrolyte in contact with said electrodes comprising a substantially water-free methanamide solvent containing dissolved therein a compound from the group consisting of the chloride, nitrate and perchlorate of magnesium.

3. A primary cell comprising a positive electrode and a magnesium negative electrode, an electrolyte in contact with said electrodes comprising a substantially water-free methanamide solvent containing dissolved therein a compound from the group consisting of the chloride, nitrate and perchlorate of magnesium and an oxidizing body exposed to said electrolye and in conductive contact with said positive electrode.

4. A primary cell comprising a positive electrode and a magnesium negative electrode, and an electrolyte in contact with said electrodes comprising a substantially water-free methanamide solvent containing magnesium chloride dissolved therein.

JOSEPH J. COLEMAN.
DEMETRIOS V. LOUZOS.

No references cited.